(12) United States Patent
Chunduru Venkata et al.

(10) Patent No.: US 11,418,451 B2
(45) Date of Patent: Aug. 16, 2022

(54) ROUTING NETWORK TRAFFIC ASSOCIATED WITH AN APPLICATION BASED ON A TRANSACTION OF THE APPLICATION

(71) Applicant: Verizon Patent and Licensing Inc., Basking Ridge, NJ (US)

(72) Inventors: Sivanaga Ravi Kumar Chunduru Venkata, Irving, TX (US); Michael J. Pepe, Smithtown, NY (US); Gregg L. Veinpel, Kennewick, WA (US); Viraj Parekh, Lawrenceville, NJ (US); Amit Kapoor, Clarksburg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 51 days.

(21) Appl. No.: 16/947,582

(22) Filed: Aug. 7, 2020

(65) Prior Publication Data

US 2020/0366616 A1   Nov. 19, 2020

Related U.S. Application Data

(63) Continuation of application No. 16/262,512, filed on Jan. 30, 2019, now Pat. No. 10,764,193.

(51) Int. Cl.
| | |
|---|---|
| *H04L 47/2425* | (2022.01) |
| *H04L 67/75* | (2022.01) |
| *H04L 45/745* | (2022.01) |
| *G06F 9/54* | (2006.01) |
| *H04L 45/50* | (2022.01) |

(52) U.S. Cl.
CPC .......... *H04L 47/2433* (2013.01); *G06F 9/547* (2013.01); *H04L 45/50* (2013.01); *H04L 45/745* (2013.01); *H04L 67/36* (2013.01); *G06F 2209/541* (2013.01)

(58) Field of Classification Search
CPC ... H04L 47/2433; H04L 45/50; H04L 45/745; H04L 67/36; H04L 41/5019; H04L 45/306; H04L 45/3065; H04L 67/322; H04L 67/327; G06F 9/547; G06F 2209/541
See application file for complete search history.

(56) References Cited

U.S. PATENT DOCUMENTS

| | | | |
|---|---|---|---|
| 8,670,405 B1 * | 3/2014 | Lee | H04L 69/14 370/331 |
| 2006/0088034 A1 * | 4/2006 | Santitoro | H04L 47/18 370/395.21 |
| 2014/0019604 A1 * | 1/2014 | Twitchell, Jr. | H04L 47/2416 709/223 |
| 2014/0297805 A1 | 10/2014 | Chaplot et al. | |

(Continued)

*Primary Examiner* — Walli Z Butt
*Assistant Examiner* — Shawn D Miller

(57) ABSTRACT

An example method can include detecting a transaction associated with an application; identifying a characteristic of the transaction; determining a priority for network traffic associated with the application, based on the identified characteristic; selecting, from a plurality of types of networks that are communicatively coupled with the user device and based on the priority for the network traffic, a network type for the network traffic; and causing the network traffic to be routed, from the user device, through a network device associated with the selected network type.

20 Claims, 7 Drawing Sheets

(56) References Cited

U.S. PATENT DOCUMENTS

| | | | |
|---|---|---|---|
| 2015/0096008 A1* | 4/2015 | Short | H04L 63/0227 |
| | | | 726/13 |
| 2015/0143456 A1* | 5/2015 | Raleigh | H04W 12/088 |
| | | | 726/1 |
| 2015/0282058 A1 | 10/2015 | Forssell | |
| 2017/0324647 A1* | 11/2017 | Anand | H04L 45/02 |
| 2018/0069901 A1* | 3/2018 | Ghai | H04L 61/2061 |

\* cited by examiner

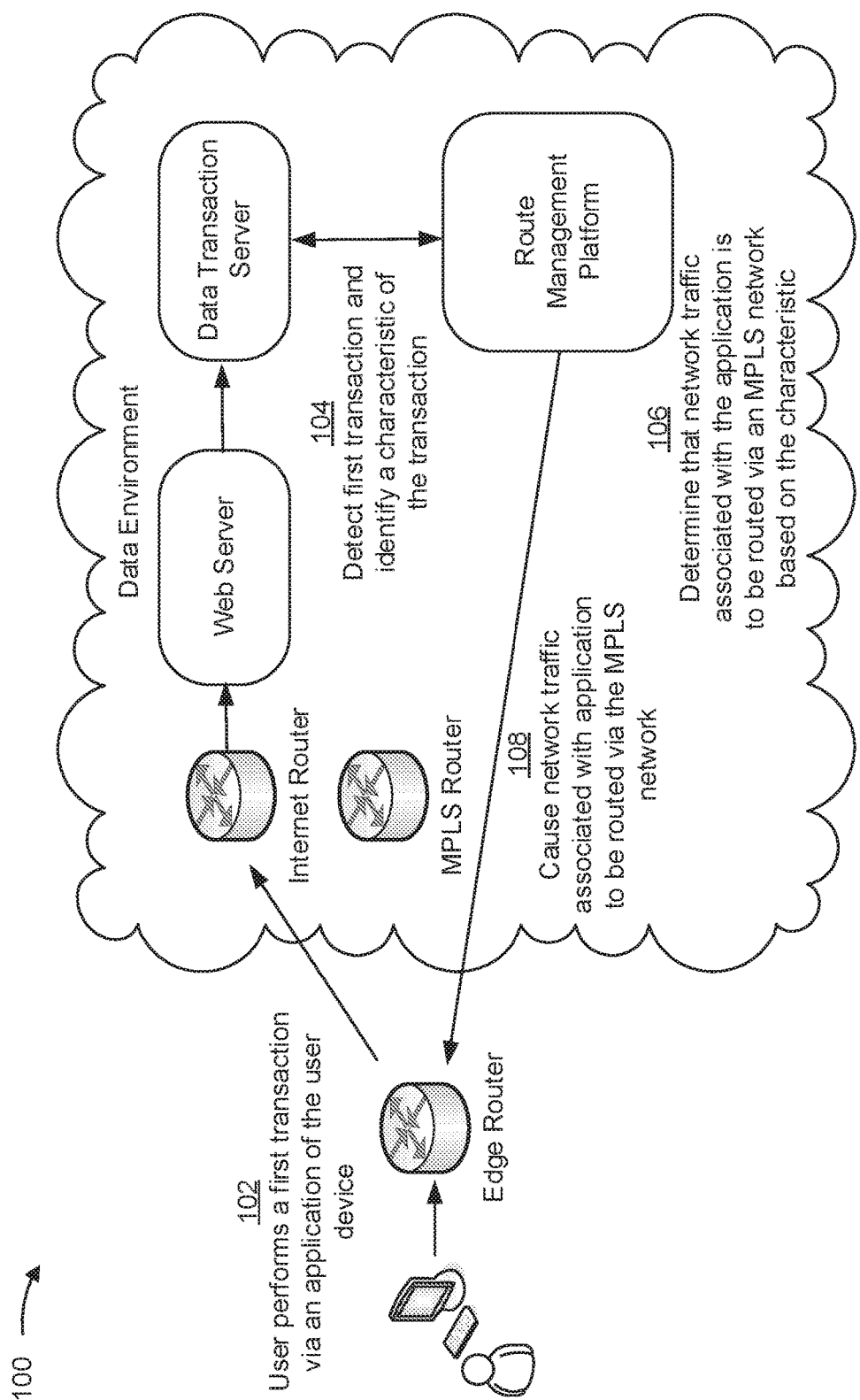

ROUTING NETWORK TRAFFIC ASSOCIATED WITH AN APPLICATION BASED ON A TRANSACTION OF THE APPLICATION

RELATED APPLICATION

This application is a continuation of U.S. patent application Ser. No. 16/262,512, entitled "ROUTING NETWORK TRAFFIC ASSOCIATED WITH AN APPLICATION BASED ON A TRANSACTION OF THE APPLICATION," filed Jan. 30, 2019, which is incorporated herein by reference.

BACKGROUND

Routing network traffic includes selecting, for the network traffic, a path in a network, a path between networks, and/or a path across multiple networks. The path is in a data plane of the network and extends from a source (e.g., an end user, a data network, and/or the like) to a destination (e.g., another end user, another data network, and/or like). Routers can be placed throughout networks and configured to facilitate (e.g., via a control plane of the network) routing of the network traffic, from the source to the destination, according to routing tables and/or instructions from one or more network management devices.

BRIEF DESCRIPTION OF THE DRAWINGS

FIGS. 1A-1D are diagrams of an example implementation described herein.

DETAILED DESCRIPTION OF PREFERRED EMBODIMENTS

Figure 1B:
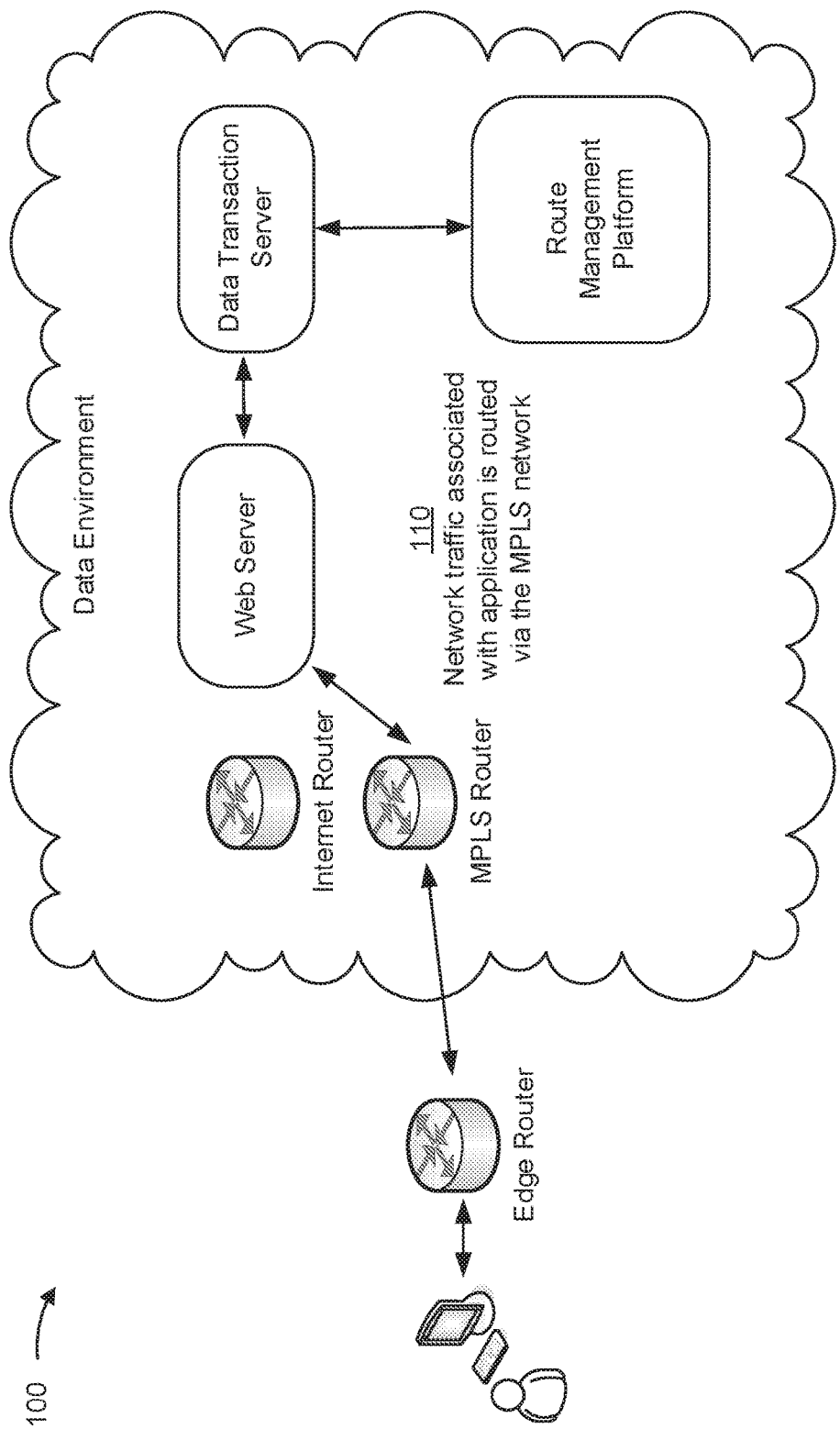

The following detailed description of example implementations refers to the accompanying drawings. The same reference numbers in different drawings can identify the same or similar elements.

In some instances, such as in a software defined wide area network (SD-WAN), application aware routing can be implemented to ensure that data associated with a particular application reaches a destination. For example, the SD-WAN can be configured to route data for critical applications through a high priority network where a service level agreement (SLA) (e.g., between an entity associated with the application and an entity associated with the SD-WAN) is to guarantee a certain amount of reliability and/or speed offered by the high priority network, while the other non-critical network traffic can be routed through a low priority network that can have relatively lower performance capabilities than the high priority network. In such instances, the SD-WAN analyzes (e.g., via a deep packet inspection (DPI)), in real-time, the network traffic to determine an application associated with the network traffic and routes the network traffic accordingly. However, if the SD-WAN is configured to route network traffic for multiple applications over a high priority network and there are multiple connections ongoing for the multiple applications, the high priority network might not have enough bandwidth for the network traffic from the multiple applications. Therefore, some network traffic from one or more of the multiple applications needs to be routed over another network, which can lead to critical network traffic for the one or more applications being lost or dropped. Furthermore, having to route the network traffic over another network (that is not a high priority network) defeats the purpose of any SLA associated with the one or more applicants and/or violates the SLA for the one or more applications to have traffic routed over the high priority network, According to some implementations described herein, a route management platform can route network traffic associated with an application based on a transaction of the application. In some implementations, the route management platform can detect a transaction associated with an application, identify a characteristic of the transaction, determine a priority for network traffic associated with the application based on the characteristic, select a network type for the network traffic, and cause the network traffic to be routed through a network associated with the selected network type. In this way, the route management platform can perform routing for applications based on transactions that indicate that the application is and/or is going to be sending and/or receiving network traffic that is critical (e.g., relative to an SLA associated with the application).

Therefore, the route management platform, as described herein, enables more granularity, relative to previous techniques, when making routing decisions, by performing an analysis (e.g., a DPI) of transactions of applications, not simply the application itself, which enables more efficient use of network resources. For example, the route management platform prevents wasting resources (e.g., of a high priority network) on an application that is not sending or receiving critical network traffic, thus freeing up more resources for an application that is sending or receiving critical network traffic. Moreover, the route management platform conserves computing resources (e.g., processing resources, memory resources, and/or the like) and/or network resources associated with resending critical network traffic and/or associated with accounting for dropped critical network traffic (e.g., which can cause errors, failures, and/or the like). For example, in previous techniques, the critical network traffic could have been dropped from a preferred network (e.g., a preferred network as defined by an SLA associated with the application, such as a multiprotocol label switching (MPLS) network) because another application was sending or receiving non-critical network traffic over the preferred network (e.g., over a high priority network). As described herein, the route management platform can identify the non-critical network traffic based on a transaction associated with the application and route that network traffic over another network (e.g., an internet network) to enable the critical network traffic to be routed over the preferred network.

As used herein, "network traffic" or "traffic" can refer to information communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

FIGS. 1A-1D are diagrams of an example implementation 100 described herein. Example implementation 100 includes a user device, an edge router, and a data environment that includes a first router (shown as "internet router"), a second router (shown as "MPLS router"), a web server, a data transaction server, and a route management platform. In some implementations, the edge router and/or data environment can be configured as an SD-WAN. The edge router can be a router that links end users to the data environment. The data environment can be a network of network devices, server devices, and/or the like configured to provide a service via an application. In some implementations, the data environment and/or edge router can be owned, operated, and/or maintained by a same network service provider. The internet router can be a router of an internet network (e.g., a secure internet network, a private internet network, a public internet network, and/or the like) of the data environment, and the MPLS router can be a router of an MPLS network of the data environment.

As shown in FIG. 1A, and by reference number 102, a user performs a first transaction via an application of the user device. For example, such a transaction can include the user logging into the application, a user accessing a feature of the application, a user opening a form of the application, and/or the like. In some implementations, the application can be a browser of the user device and/or can be associated with the browser of the user device. Accordingly, in such cases, the first transaction can be performed via the browser of the application.

As further shown in FIG. 1A, network traffic associated with the first transaction can be routed through the edge router, through the internet router, and to the web server and/or the data transaction server. The web server can host a web-based application associated with the application and the data transaction server can include a database that manages and/or maintains transactions associated with the application. For example, the web server and/or data transaction server can be associated with an entity that offers and/or provides a service, via the application, to the user. Such an entity can be considered as a customer of the network service provider that provides network services via the edge router and/or the data environment. Accordingly, the user can utilize a service of the entity via network resources maintained by the network service provider.

As a specific example, the application can be a vehicle inventory application that permits the user to browse an inventory of products. Accordingly, a user can browse the vehicle inventory via an application of the user device, which can include a smartphone of the user, a work station (e.g., a computer, such as a personal computer, a laptop computer, a tablet computer, and/or the like) of a dealership associated with the vehicle inventory, and/or the like. Therefore, the first transaction can include one or more of the user logging into the application, accessing details associated with a particular vehicle of the vehicle inventory, performing a search for a vehicle of the vehicle inventory, logging out of the application, and/or the like. In the following examples, the first transaction can be assumed to be the user logging into the application.

In this way, a first transaction can be initiated to permit the route management platform to determine, based on the first transaction, which type of network is to be used for routing traffic associated with the application.

As further shown in FIG. 1A, and by reference number 104, the route management platform detects the first transaction and identifies a characteristic of the first transaction. According to some implementations, the route management platform can detect the first transaction based on receiving an application programming interface (API) call from the data transaction server. For example, an agent, associated with the application, on the data transaction server can be configured to request the route management platform to determine a path for the network traffic based on receiving information associated with the first transaction. Additionally, or alternatively, a similar API call can be received from the web server and/or the user device.

The route management platform can identify the characteristic of the first transaction based on information received from the data transaction server. For example, an API call can include the characteristic of the first transaction. As described herein, the characteristic of the first transaction can include information associated with the first transaction that can be used by the route management platform to route network traffic associated with the application. For example, the characteristic can include information identifying a type of the first transaction (e.g., a log in transaction, a log out transaction, a feature access transaction, a navigation-related transaction (e.g., opening or closing a menu), a form related transaction (e.g., entering information in a field, submitting a form, and/or the like), and/or the like. In some implementations, the characteristic can include information relating to a user associated with the first transaction (e.g., a user account associated with the application, a user identifier associated with the first transaction, and/or the like). Additionally, or alternatively, the characteristic can include information identifying an entity associated with the first transaction (e.g., an entity that owns, operates, maintains, and/or provides a service via the application using the data network and/or edge router). In some implementations, the characteristic can include information identifying a timing associated with the first transaction (e.g., timing of when the first transaction occurred, when an operation associated with the first transaction is to occur, and/or the like). Additionally, or alternatively, the characteristic can include a priority identifier that indicates a level of priority that is to be given to network traffic associated with the application based on the first transaction.

Referring to the example above, the route management platform can receive a notification (e.g., an API call) that indicates that the user logged into the application via the user device. Accordingly, the notification can indicate that the first transaction occurred and/or information identifying the type of transaction (e.g., a log in transaction), the user associated with the first transaction, the entity associated with the first transaction (and/or the application), and/or the like.

In this way, the route management platform can detect that a transaction occurred and/or identify a characteristic of the first transaction to permit the route management platform to determine a priority for network traffic associated with the application.

As further shown in FIG. 1A, and by reference number 106, the route management platform determines that network traffic associated with the application is to be routed via an MPLS network based on the characteristic. The network traffic can include application data (or PDUs) associated with the application. To route the network traffic via the MPLS network, the route management platform can determine that the network traffic is to be routed through the MPLS router of the data environment. For example, based on the characteristic and/or detecting the first transaction, the route management platform can determine that network traffic associated with the application is to be treated as critical application traffic (e.g., based on an SLA associated with the application). The MPLS network can be configured to carry critical network traffic of applications (e.g., because the MPLS network provides greater performance (e.g., more security, more speed, more reliability, and/or the like) relative to the internet network). Therefore, the route management platform can determine that network traffic associated with the application is to be routed through the MPLS router rather than through the internet router.

In some implementations, the route management platform can determine a priority for the network traffic associated with the application based on the characteristic of the first transaction. The priority can correspond to a priority with which the network traffic associated with the application is to be routed between the user device and the web server and/or the data transaction server of example implementation 100. In some implementations, the priority can be based on and/or defined by an SLA associated with the application. The priority can indicate whether the network traffic associated with the application is to be given priority over network traffic associated with one or more other applications, based on the characteristic of the first transaction.

In some implementations, the route management platform can maintain a mapping of applications and/or transactions (and/or corresponding characteristics of the transactions) of the applications based on corresponding SLAs of the applications. The SLAs can indicate a level of service (e.g., speed, reliability, latency, bandwidth, and/or the like) that is to be provided to the application when one or more transactions associated with the application occur. In such cases, the SLAs and/or mappings can be loaded into and/or provided to the route management platform to permit the route management platform to determine routes for network traffic associated with corresponding applications according to the SLAs. As described herein, a mapping can indicate a particular manner in which network traffic associated with the application is to be routed based on a transaction occurring (e.g., as defined by the respective SLAs of the applications). For example, for each application that can be hosted by and/or accessed via the user device and/or the data environment, the route management platform can include a mapping of the transactions of the application and which network is to carry network traffic associated with the application after those transactions occur. In other words, the mapping can indicate which transactions of an application are to cause network traffic associated the application to be routed through which network (e.g., as defined by the SLA of the application). Therefore, the mapping can indicate that the network traffic associated with the application is to be routed through the MPLS based on the characteristic of the transaction, as described herein.

Referring to the example above on the vehicle inventory application, the route management platform can determine that the characteristic includes a user logging in to the vehicle inventory application. In such an example, according to an SLA associated with the application, network traffic associated with the application from the user device (or any other user device) is to be transmitted over an MPLS network after a user logs into the application (e.g., to ensure that the logged in user has uninterrupted access, via the MPLS network, to the features of the application). Therefore, the route management platform can determine (e.g., from a mapping of the SLA and/or transactions for the application) that when the user logs in to the application (as opposed to a user using the application as a guest), network traffic associated with the application is to be transmitted via the MPLS network. Accordingly, because network traffic associated with the application was previously transmitted through the internet network (e.g., through the internet router), the route management platform can instruct the edge router to route subsequent network traffic (or any network traffic transmitted after the first transaction) associated with the application via the MPLS network.

In this way, the route management platform can determine that network traffic associated with an application is to be routed through a particular network (the MPLS network in this example) based on a characteristic of a transaction associated with the application.

As further shown in FIG. 1A, and by reference number 108, the route management platform causes the network traffic associated with the application to be routed through the MPLS network. For example, the route management platform can instruct the edge router (and/or one or more other devices of an MPLS network, such as the MPLS router, the web server, the data transaction server, and/or the like) to route the network traffic for the application through the MPLS router (e.g., via a control plane of the data environment). In some implementations, the network traffic that is to be routed through the MPLS network corresponds to any network traffic that is associated with the application and is transmitted from the user device after the first transaction and/or that is to be received by the user device after the first transaction (e.g., from the web server and/or the data transaction server).

In some implementations, the route management platform can instruct the edge router to route the network traffic associated with the application through the MPLS network, indefinitely. For example, the route management platform can instruct the edge router (and/or any other device of the data environment) to route any subsequently received network traffic (e.g., from the user device, the web server, the data transaction server, and/or the like) associated with the application through the MPLS network until further notice (e.g., which can be received based on the route management platform detecting another transaction). Accordingly, referring to the example above, a user can perform a plurality of transactions via the vehicle inventory application using the MPLS network, such as navigate the vehicle inventory, view one or more details of a particular vehicle, search for one or more vehicles, open and/or enter information into a form (e.g., to apply for a loan or purchase the vehicle), and/or the like. Therefore, the edge router, according to the instructions, can subsequently route traffic associated with the application, from the user device to the web server and/or data transaction server through the MPLS network until the edge router receives instructions (e.g., from the route management platform) to route the traffic via another network.

In some implementations, the route management platform can instruct the edge router (and/or any other network device of the data environment) to route the network traffic associated with the application through the MPLS according to one or more constraints. For example, the route management platform can instruct the route management platform to route the network traffic associated with the application through the MPLS network for a threshold time period (e.g., 5 minutes, 10 minutes, 30 minutes, an hour, and/or the like) after the first transaction. Additionally, or alternatively, the route management platform can instruct the route management platform to route a threshold amount of network traffic (e.g., a threshold number of communications, a threshold amount of data, and/or the like) through the MPLS network. Therefore, referring to the example above, the user device can be connected with the web server and/or data transaction server via the MPLS network for a threshold time period to permit the user to interact with the application and/or perform a particular number of transactions (e.g., searches of the vehicle inventory, accesses to details of vehicles, and/or the like) until network traffic associated with vehicle inventory application is routed back through the internet network.

In this way, network traffic associated with an application can be sent through a particular network (e.g., an MPLS network or an internet network as shown in example implementation 100) based on a characteristic of a transaction, of the application, that occurred and/or was detected by the route management platform.

As shown in FIG. 1B, and by reference number 110, the network traffic associated with the application is routed via the MPLS network. For example, as shown in FIG. 1B, the edge router switched, relative to FIG. 1A, from routing network traffic associated with the application through the internet router to routing the network traffic associated with the application through the MPLS network. In some implementations, the edge router can configure route information for the network traffic associated with the application to be routed through the MPLS when being provided by the web server and/or the data transaction server. For example, when network traffic associated with the application is transmitted from the user device to the web server and/or data transaction server, the edge router can indicate that the MPLS network is to be used to route return network traffic, associated with the application, from the web server and/or the data transaction server. Accordingly, the web server and/or data transaction server can be informed that the network traffic associated with the application and received from that particular user device is to be provided via the MPLS network. Additionally, or alternatively, the route management platform can instruct the data transaction server and/or the web server to route network traffic associated with the application and the user device through the MPLS network.

As described herein, routing network traffic associated with application over the MPLS network, rather than the internet network, provides the user with enhanced network performance, such that the user and/or user device can more easily, quickly, and/or efficiently interact with the application and/or navigate features of the application. Therefore, referring to the example above, if the user logs in to the application, rather than interact with the application as a guest, when further interacting with the vehicle inventory application, the user can experience enhanced network performance via the MPLS network rather than the internet network. For example, the user and/or user device can more quickly and easily navigate the vehicle inventory, view one or more details of a particular vehicle, search for one or more vehicles, open and/or enter information into a form (e.g., to apply for a loan or purchase the vehicle), and/or the like.

In this way, the user device and the web server and/or data transaction server can engage in a communication session via the MPLS network based on the user performing a particular transaction associated with the application.

Figure 1C:
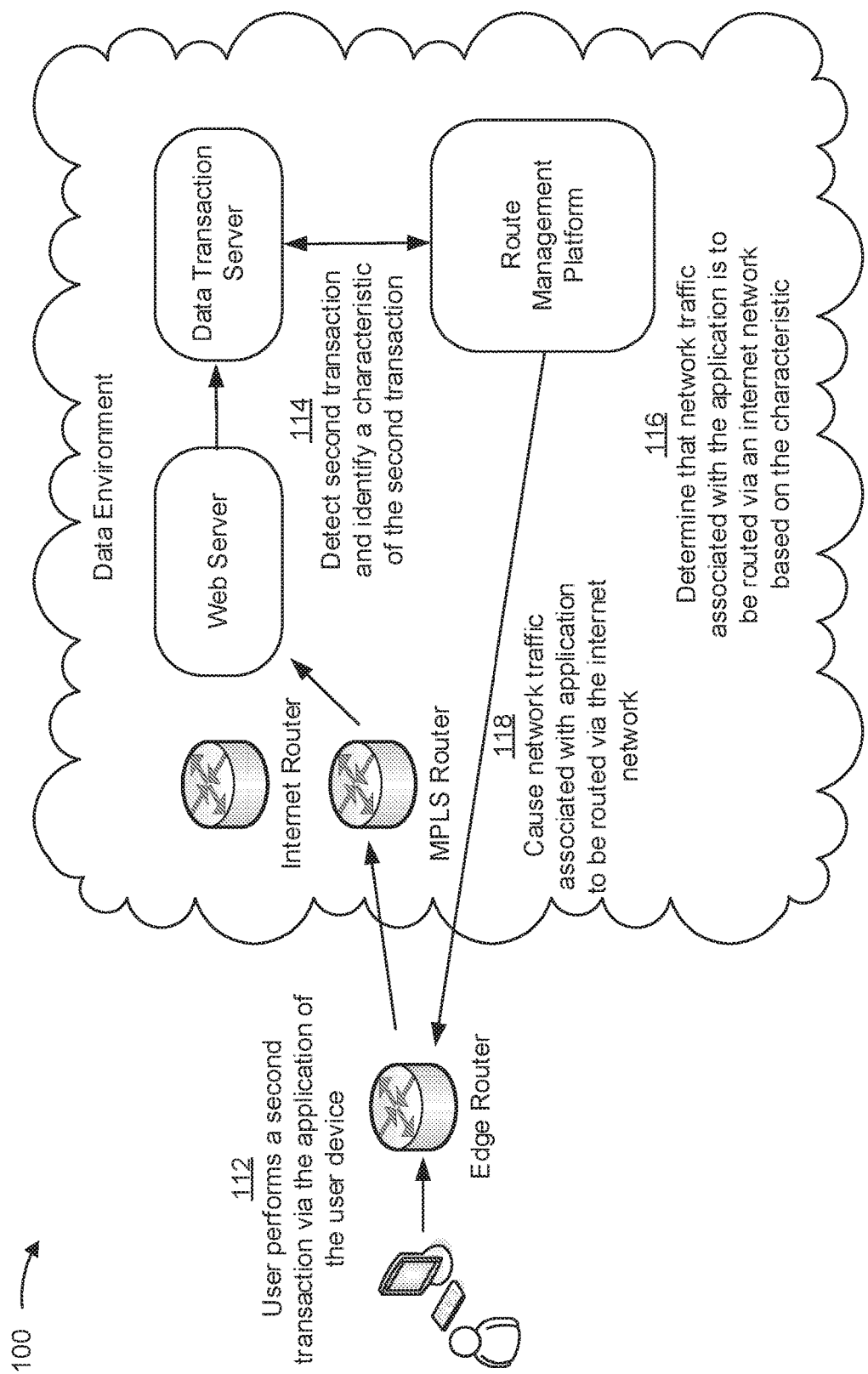

As shown in FIG. 1C, and by reference number 112, the user performs a second transaction via the application of the user device. The second transaction can be performed in a similar manner as the first transaction, as described above. However, the second transaction of the application can have a different characteristic than the first transaction of the application (e.g., can be a different type of transaction, can be associated with a different user, can be associated with a different entity, can be performed with different timing (e.g., a different time of day, week, year, and/or the like), and/or the like). As an example, referring to the above, the second transaction can be the user logging out of the vehicle inventory application.

As shown in FIG. 1C, the network traffic associated with the second transaction can be routed through the edge router, through the MPLS router, and to the web server and/or data transaction server. In some implementations, network traffic associated with the second transaction is routed through the MPLS network because the second transaction occurs after the first transaction. Accordingly, the network traffic associated with the second transaction is routed through the MPLS network, because the network traffic associated with the second transaction is network traffic that is associated with the application, and is transmitted after the first transaction occurs or is detected.

As further shown in FIG. 1C, and by reference number 114, the route management platform detects the second transaction and identifies a characteristic of the second transaction. The route management platform can detect the second transaction in a similar manner as the first transaction and/or identify the characteristic of the second transaction in a similar manner as the identifying the characteristic of the first transaction, as described above. Referring to the above example, the route management platform can determine, from the characteristic, that the user logged out of the application.

As further shown in FIG. 1C, and by reference number 116, the route management platform determines that network traffic associated with the application is to be routed via an internet network (e.g., a secure network, a public network, and/or the like) based on the characteristic. To route the network traffic via the internet network, the route management platform can determine that the network traffic is to be routed through the internet router of the data environment. For example, based on the characteristic, the route management platform can determine that network traffic associated with the application is to be treated as non-critical application traffic (e.g., based on an SLA associated with the application). The internet network can be configured to carry non-critical network traffic of applications (e.g., because routing network traffic through the internet network is less complex than routing traffic through the MPLS). Therefore, the route management platform can determine, based on the characteristic of the second transaction, the mapping of the application, and/or the SLA of the application, that network traffic associated with the application is to be routed through the internet network rather than the MPLS network. Referring to the above, logging out of the transaction can indicate that the user is no longer going to be interacting with the application, and, therefore, network traffic associated with the application can be non-critical.

As further shown in FIG. 1C, and by reference number 118, the route management platform causes the network traffic associated with the application to be routed through the internet network. For example, the route management platform can cause the network traffic associated with the application to be routed through the internet network in a similar manner as the route management platform causing the network traffic associated with the application to be routed through the MPLS network as described above (e.g., by instructing the edge router and/or any device of the data environment to route the network traffic associated with the application through the internet network).

In this way, the route management platform can configure the edge router to reroute network traffic associated with the application back through the internet router based on detecting the second transaction and/or the characteristic of the second transaction.

Figure 1D:
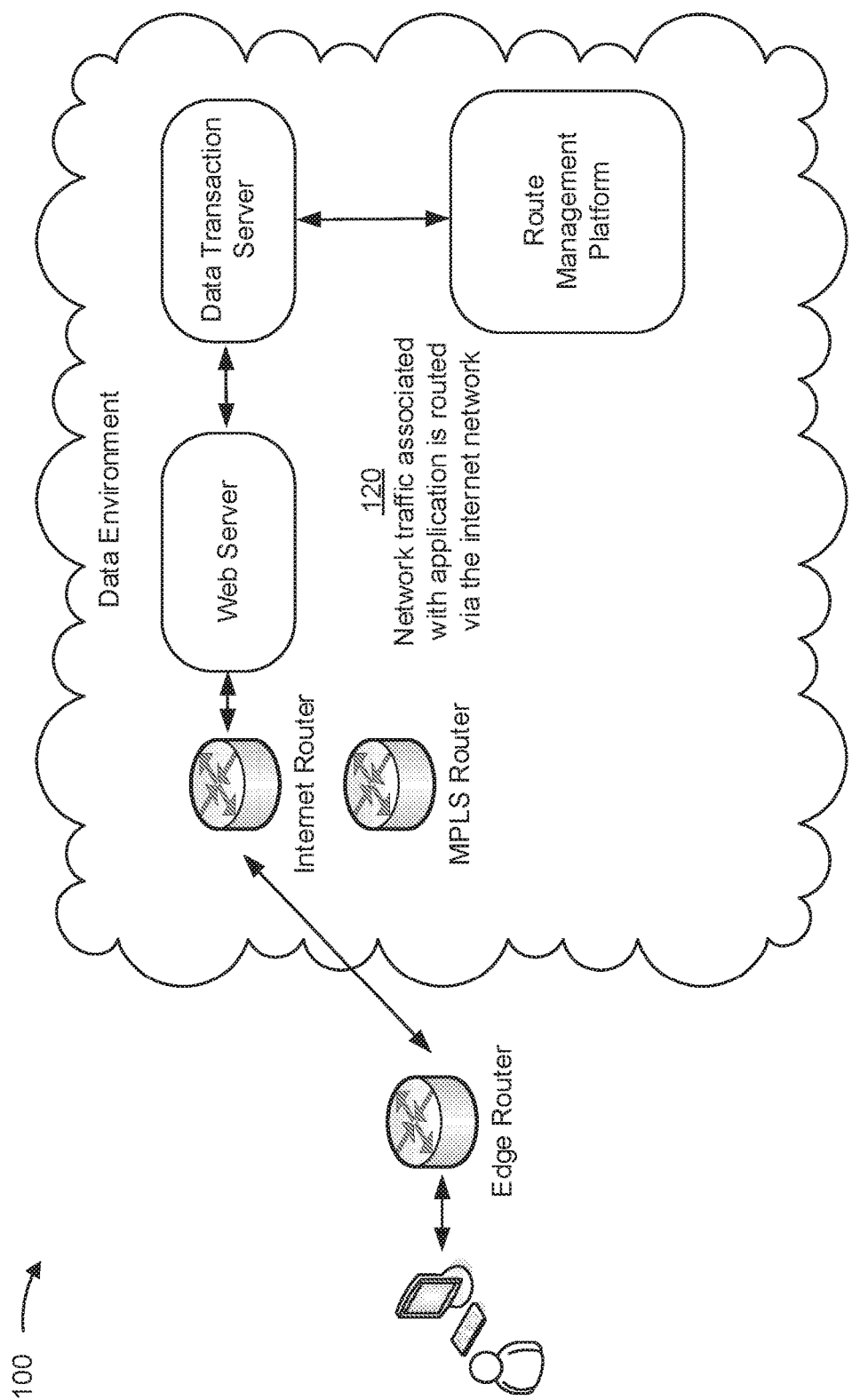

As shown in FIG. 1D, and by reference number 120, the network traffic associated with the application is routed via the internet network. For example, the edge router can switch from routing the network traffic associated with the application through the MPLS to routing the network traffic through the internet network, in a similar manner as described above in connection with FIG. 1B. Therefore, referring to the example above, while the user is logged out of the application, network traffic associated with the application can be routed through the internet network.

In this way, the route management platform enables critical network traffic, associated with an application, to be routed over a preferred network (e.g., a preferred network as defined by an SLA of the application) and non-critical network traffic to be routed over another network. Accordingly, the route management platform provides more efficient use of the resources of the preferred network by ensuring that the preferred network is used for transmission of critical network traffic of one or more applications as determined based on transactions of the one or more applications. In some implementations, the route management platform can ensure that only critical network traffic associated with applications, as defined by the transactions of the applications (and by the SLAs associated with applications), is transmitted over the preferred network. Accordingly, the route management platform can ensure that resources are available for critical network traffic by not transmitting non-critical network traffic over the preferred network. In this way, computing resources and/or network resources associated with routing critical network traffic can be conserved by ensuring that the critical network traffic is not dropped and/or lost through a transmission over the preferred network due to network resources of the preferred network being occupied for transmissions of non-critical network traffic.

As indicated above, FIGS. 1A-1D are provided merely as an example. Other examples can differ from what is described with regard to FIGS. 1A-1D.

Figure 2:
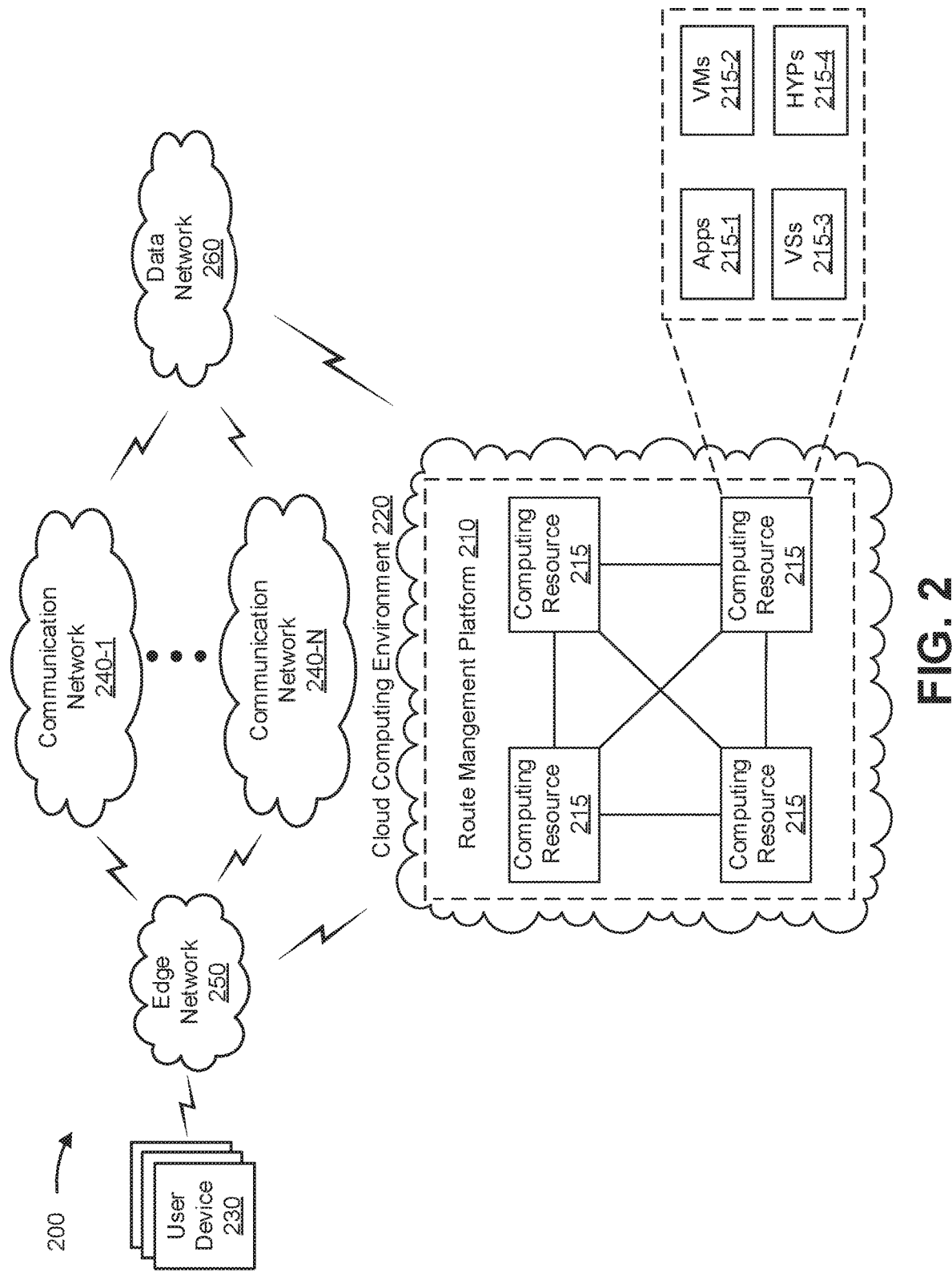
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a route management platform 210 hosted via one or more computing resources 215 of a cloud computing environment 220, one or more user devices 230 (referred to herein individually as "user device 230" and collectively as "user devices 230"), one or more communication networks 240-1 through 240-N (where N is an integer and N≥1) (referred to herein individually as "communication network 240" and collectively as "communication networks 240"), an edge network 250, and/or a data network 260. Devices of environment 200 can interconnect via wired connections, wireless connections, or a combination of wired and wireless connections.

Route management platform 210 includes one or more computing resources assigned to determine routing of network traffic associated with applications of user device 230. For example, route management platform 210 can be a platform implemented by cloud computing environment 220 that can instruct network devices of edge network 250 to route network traffic associated with an application of user device 230 through one or more of communication networks 240 based on detecting that a particular transaction of the application occurred. In some implementations, route management platform 210 is implemented by computing resources 215 of cloud computing environment 220.

Route management platform 210 can include a server device or a group of server devices. In some implementations, route management platform 210 can be hosted in cloud computing environment 220. Notably, while implementations described herein describe route management platform 210 as being hosted in cloud computing environment 220, in some implementations, route management platform 210 can be non-cloud-based or can be partially cloud-based.

Cloud computing environment 220 includes an environment that delivers computing as a service, whereby shared resources, services, etc. can be provided to user devices 230. Cloud computing environment 220 can provide computation, software, data access, storage, and/or other services that do not require end-user knowledge of a physical location and configuration of a system and/or a device that delivers the services. As shown, cloud computing environment 220 can include route management platform 210 and computing resource 215.

Computing resource 215 includes one or more personal computers, workstation computers, server devices, or another type of computation and/or communication device. In some implementations, computing resource 215 can host route management platform 210. The cloud resources can include compute instances executing in computing resource 215, storage devices provided in computing resource 215, data transfer devices provided by computing resource 215, etc. In some implementations, computing resource 215 can communicate with other computing resources 215 via wired connections, wireless connections, or a combination of wired and wireless connections.

As further shown in FIG. 2, computing resource 215 can include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that can be provided to or accessed by user device 230. Application 215-1 can eliminate a need to install and execute the software applications on user device 230. For example, application 215-1 can include software associated with route management platform 210 and/or any other software capable of being provided via cloud computing environment 220. In some implementations, one application 215-1 can send/receive information to/from one or more other applications 215-1, via virtual machine 215-2.

Virtual machine 215-2 includes a software implementation of a machine (e.g., a computer) that executes programs like a physical machine. Virtual machine 215-2 can be either a system virtual machine or a process virtual machine, depending upon use and degree of correspondence to any real machine by virtual machine 215-2. A system virtual machine can provide a complete system platform that supports execution of a complete operating system ("OS"). A process virtual machine can execute a single program and can support a single process. In some implementations, virtual machine 215-2 can execute on behalf of a user (e.g., user device 230), and can manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 can present a virtual operating platform to the guest operating systems and can manage the execution of the guest operating systems. Multiple instances of a variety of operating systems can share virtualized hardware resources.

User device 230 includes one or more devices capable of receiving, generating, storing, processing, and/or providing information associated with transactions performed via an application to permit route management platform 210 to route traffic associated with the application based on characteristics of the respective transactions. For example, user device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Communication network 240 includes one or more wired and/or wireless networks. For example, communication network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, an internet (e.g., the Internet), a secure network, a public network, an MPLS network, a fiber optic-based network, a cloud computing network, or the like, and/or a combination of these or other types of networks. Two or more of communication networks 240 can be a same type of network (e.g., that utilize a same communication protocol, a same type of routing device, a same type of routing mechanism, and/or the like) and/or different types of networks (e.g., that utilize different communication protocols, different types of routing devices, different types of routing mechanisms, and/or the like). Accordingly, communication networks 240 can be configured to have the same or different network performance characteristics, such as speed, reliability, latency, security, and/or the like.

Edge network 250 includes one or more wired and/or wireless networks at an edge of communication networks 240. For example, edge network 250 can include a LAN, a WAN, a MAN, a cloud computing network, and/or the like. In some implementations, edge network 250 can be owned, operated, and/or maintained by an entity that subscribes to one or more services of a service provider associated with route management platform 210, communication networks 240, edge network 250, and/or data network 260. In some implementations, edge network 250 can be accessible via one or more edge routers capable of processing and/or transferring network traffic between user devices 230 and/or between a user device 230 and data network 260. In some implementations, edge network 250 can include one or more network devices, such as a firewall, a router, a gateway, a switch, a hub, a bridge, a reverse proxy, a server (e.g., a proxy server), a security device, an intrusion detection device, a load balancer, or a similar device.

Data network 260 includes one or more wired and/or wireless data networks. For example, data network 260 can include an internet protocol (IP) multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
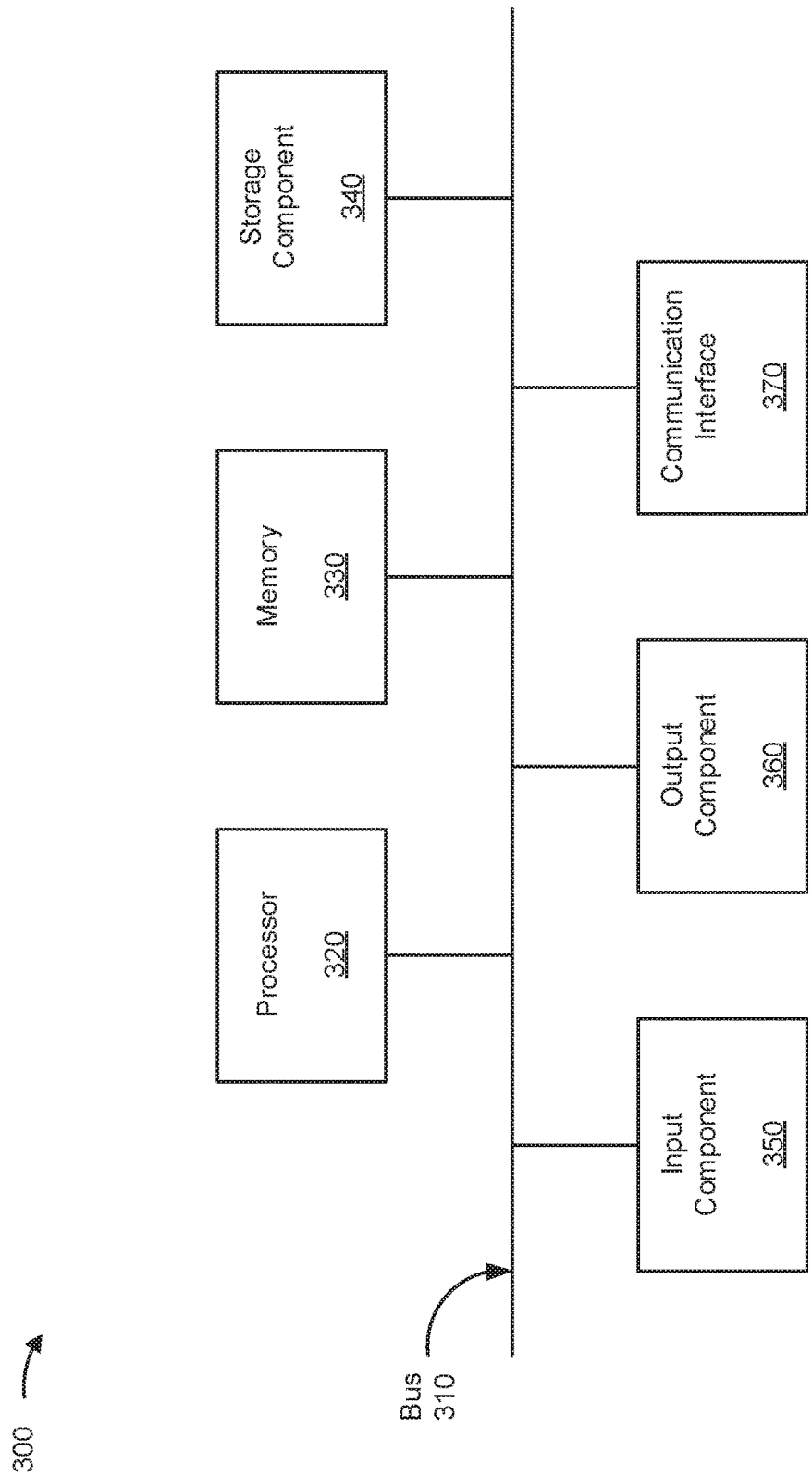
FIG. 3 is a diagram of example components of one or more devices of FIG. 2.

FIG. 3 is a diagram of example components of a device 300. Device 300 can correspond route management platform 210, computing resource 215, and/or user device 230. In some implementations, route management platform 210, computing resource 215, and/or user device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
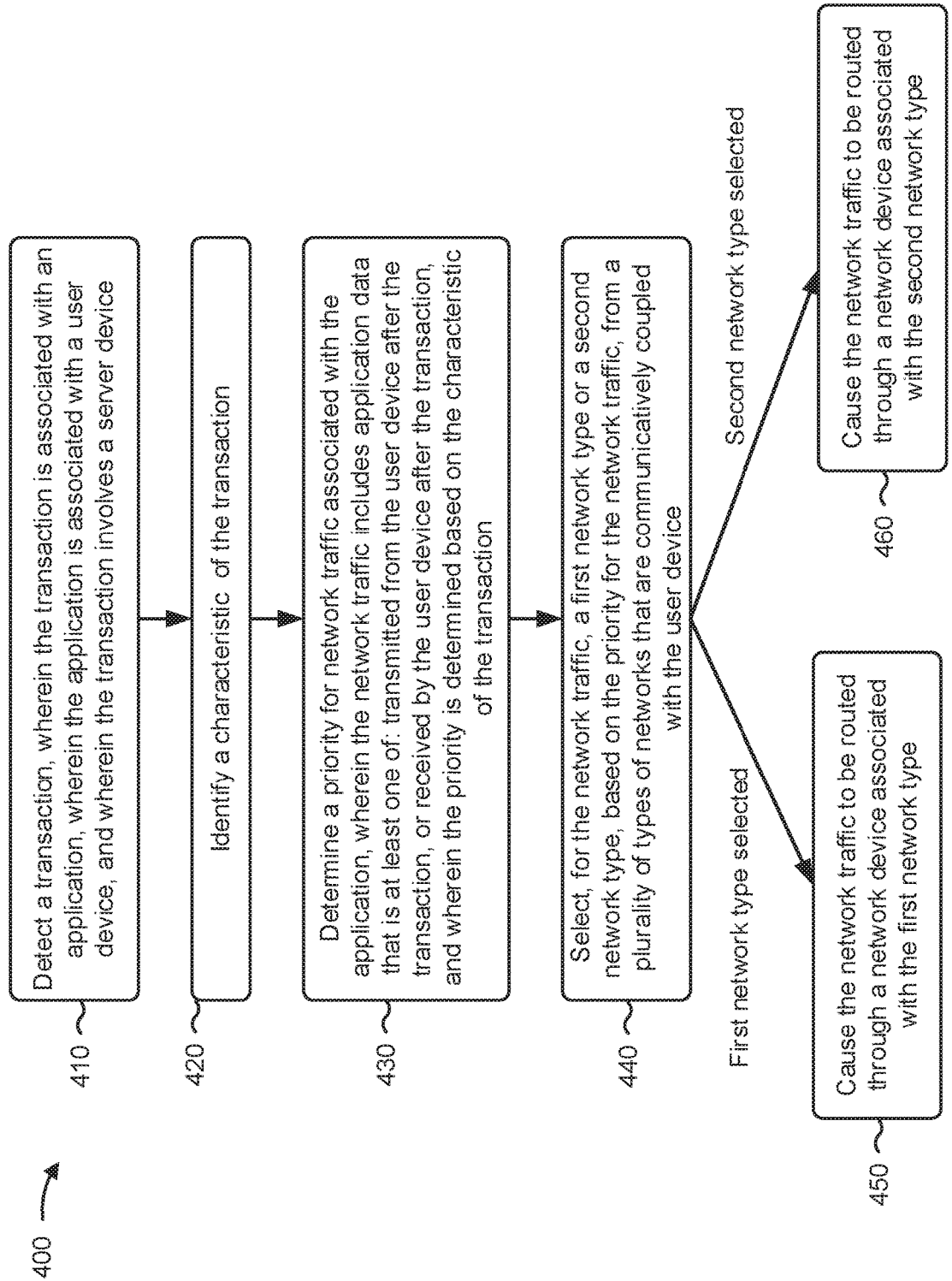
FIG. 4 is a flow chart of an example process for routing network traffic associated with an application based on a transaction of the application.

FIG. 4 is a flow chart of an example process 400 for routing network traffic associated with an application based on a transaction of the application. In some implementations, one or more process blocks of FIG. 4 can be performed by a route management platform (e.g., route management platform 210). In some implementations, one or more process blocks of FIG. 4 can be performed by another device or a group of devices separate from or including a route management platform (e.g., route management platform 210), such as a computing resource (e.g., computing resource 215) and a user device (e.g., user device 230).

As shown in FIG. 4, process 400 can include detecting a transaction, wherein the transaction is associated with an application, wherein the application is associated with a user device, and wherein the transaction involves a server device (block 410). For example, the route management platform (e.g., using a processor 320, a memory 330, a storage component 340, an input component 350, and a communication interface 370, and/or the like) can detect a transaction, as described above. In some implementations, the transaction is associated with an application. In some implementations, the application is associated with a user device. In some implementations the transaction involves a server device.

As further shown in FIG. 4, process 400 can include identifying a characteristic of the transaction (block 420). For example, the route management platform (e.g., using a processor 320, a memory 330, a storage component 340, an input component 350, and a communication interface 370, and/or the like) can identify a characteristic of the transaction, as described above.

As shown in FIG. 4, process 400 can include determining a priority for network traffic associated with the application, wherein the network traffic includes application data that is at least one of: transmitted from the user device after the transaction, or received by the user device after the transaction, and wherein the priority is determined based on the characteristic of the transaction (block 430). For example, the route management platform (e.g., using a processor 320, a memory 330, a storage component 340, an input component 350, and a communication interface 370, and/or the like) can determine a priority for network traffic associated with the application, as described above. In some implementations, the network traffic includes application data that is at least one of: transmitted from the user device after the transaction, or received by the user device after the transaction. In some implementations, the priority is determined based on the characteristic of the transaction.

As shown in FIG. 4, process 400 can include selecting, for the network traffic, a first network type or a second network type, based on the priority for the network traffic, from a plurality of types of networks that are communicatively coupled with the user device (block 440). For example, the route management platform (e.g., using a processor 320, a memory 330, a storage component 340, an input component 350, and a communication interface 370, and/or the like) can select the network type for the network traffic, as described above. In some implementations, the network type is selected, based on the priority for the network traffic, from a plurality of types of networks that are communicatively coupled with the user device.

As shown in FIG. 4, process 400 can include causing the network traffic to be routed through a network device associated with the first network type (block 450). For example, the route management platform (e.g., using a processor 320, a memory 330, a storage component 340, an output component 360, and a communication interface 370, and/or the like) can cause the network traffic to be routed through a network device associated with the selected network type, as described above. In some implementations, the first network type is an MPLS network.

As shown in FIG. 4, process 400 can include causing the network traffic to be routed through a network device associated with the second network type (block 460). For example, the route management platform (e.g., using a processor 320, a memory 330, a storage component 340, an output component 360, and a communication interface 370, and/or the like) can cause the network traffic to be routed through a network device associated with the selected network type, as described above. In some implementations, the first network type is an interne network (e.g., a secure network, a public network, and/or the like).

Process 400 can include additional implementations, such as any single implementation or any combination of implementations described below and/or in connection with one or more other processes described elsewhere herein.

In some implementations, the route management platform, when detecting the transaction, can receive, from the server device, an application programming interface (API) call associated with the transaction. In some implementations, the API call identifies the characteristic of the transaction. In some implementations, the route management platform, when causing the network traffic to be routed, can instruct an edge router associated with the user device to route the network traffic to the network device.

In some implementations, the plurality of types of network include at least two of: an MPLS network, a secure network, or a public network. In some implementations, the priority for the network traffic is defined based on an SLA associated with the application.

In some implementations, the transaction is a first transaction, the network traffic is first network traffic, the network type is a first network type, and the network device is a first network device. In some implementations, the route management platform can detect a second transaction associated with the application and identify a characteristic of the second transaction. In some implementations, the characteristic of the second transaction is different from the characteristic of the first transaction. In some implementations, the route management platform can determine a priority for second network traffic associated with the application. In some implementations, the second network traffic includes application data that is at least one of: transmitted from the user device after the second transaction, or received by the user device after the second transaction. In some implementations, the route management platform can select a second network type for the second network traffic. In some implementations, the second network type is selected, based on the priority for the second network traffic, from the plurality of types of networks. In some implementations, the second network type is different from the first network type. In some implementations, the route management platform can cause the second network traffic to be routed, from the user device, through a second network device associated with the second network type.

In some implementations, the characteristic includes at least one of a type of the transaction, information relating to a user associated with the transaction, information relating to an entity associated with the transaction, or information identifying a time associated with the transaction.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a device, a first transaction associated with an application,
      wherein the first transaction relates to a first type of interaction between a user and the application, and
      wherein the application is associated with a user device;
   identifying, by the device, a first characteristic of the first transaction;
   causing, by the device, first network traffic to be routed through a first network device based on the first characteristic;
   detecting, by the device, a second transaction associated with the application,
      wherein the second transaction relates to a second type of interaction between the user and the application,
      wherein the second type of interaction is different than the first type of interaction;
   identifying, by the device a second characteristic of the second transaction; and
   causing, by the device, second network traffic associated with the second transaction to be routed through a second network device based on the second characteristic, wherein the first network device and the second network device are associated with different types of networks.

2. The method of claim 1, further comprising:
determining a first priority associated with the first network traffic;
determining a second priority associated with the second network traffic;
wherein causing the first network traffic to be routed through the first network device comprises:
causing the first network traffic to be routed through the first network device based on the first priority; and
wherein causing the second network traffic to be routed through the second network device comprises:
causing the second network traffic to be routed through the second network device based on the second priority.

3. The method of claim 2, wherein the first characteristic includes a first priority identifier that indicates a first level of priority that is to be given to the first network traffic,
wherein the second characteristic includes a second priority identifier that indicates a second level of priority that is to be given to the second network traffic,
wherein determining the first priority comprises:
determining the first priority based on the first priority identifier, and
wherein determining the second priority comprises:
determining the second priority based on the second priority identifier.

4. The method of claim 2, wherein the first priority for the first network traffic and the second priority for the second network traffic are defined based on a service level agreement associated with the application.

5. The method of claim 1, further comprising:
maintaining a mapping of applications and transactions, wherein the mapping indicates a particular manner in which network traffic associated with the applications are to be routed based on a particular transaction occurring.

6. The method of claim 1, wherein the different types of networks include two of:
a multiprotocol label switching network,
a secure network, or
a public network.

7. The method of claim 1, wherein the first characteristic comprises at least one of:
the first type of interaction,
information relating to the user,
information relating to an entity associated with the first transaction, or
information identifying a time associated with the first transaction.

8. A device, comprising:
one or more memories; and
one or more processors, communicatively coupled to the one or more memories, to:
detect a transaction associated with an application,
wherein the transaction relates to a type of interaction between a user and the application, and
wherein the application is associated with a user device;
identify a characteristic of the transaction,
wherein the characteristic is associated with a priority identifier that indicates a level of priority that is to be given to network traffic associated with the transaction;
determine a priority for the network traffic,
wherein the priority is determined based on the priority identifier;
select a network type for the network traffic,
wherein the network type is selected, based on the priority for the network traffic, from a plurality of types of networks; and
cause the network traffic to be routed through a network device associated with the selected network type.

9. The device of claim 8, wherein the one or more processors are further to:
maintain a mapping of applications and transactions,
wherein the mapping includes the transactions of a particular application and which network is to carry network traffic associated with that particular application.

10. The device of claim 8, wherein the one or more processors, when detecting the transaction, are to:
receive, from a server device associated with the application, an application programming interface (API) call associated with the transaction,
wherein the API call identifies the characteristic of the transaction.

11. The device of claim 8, wherein the one or more processors, when causing the network traffic to be routed, are to:
instruct an edge router associated with the user device to route the network traffic to the network device.

12. The device of claim 8, wherein the plurality of types of networks include at least two of:
a multiprotocol label switching network,
a secure network, or
a public network.

13. The device of claim 8, wherein the priority is defined based on a service level agreement associated with the application.

14. The device of claim 8, wherein the characteristic comprises at least one of:
the type of interaction,
information relating to the user,
information relating to an entity associated with the transaction, or
information identifying a time associated with the transaction.

15. A non-transitory computer-readable medium storing instructions, the instructions comprising:
one or more instructions that, when executed by one or more processors, cause the one or more processors to:
detect a transaction associated with an application,
wherein the application is associated with a user device, and
wherein the transaction relates to a type of interaction between a user and the application and involves a server device;
identify a characteristic of the transaction;
determine a priority for network traffic associated with the application,
wherein the priority is determined based on:
the characteristic of the transaction, and
a level of priority that is to be given to the network traffic;
select a network type for the network traffic,
wherein the network type is selected, based on the priority for the network traffic, from a plurality of types of networks; and
cause the network traffic to be routed through a network device associated with the network type.

16. The non-transitory computer-readable medium of claim 15, wherein the one or more instructions, that cause the one or more processors to cause the network traffic to be routed through the network device, cause the one or more processors to:
cause the network traffic to be routed through the network device for a threshold period of time.

17. The non-transitory computer-readable medium of claim 15, wherein the one or more instructions, that cause the one or more processors to detect the transaction, cause the one or more processors to:
receive, from the server device, an application programming interface (API) call associated with the transaction,
wherein the API call identifies the characteristic of the transaction.

18. The non-transitory computer-readable medium of claim 15, wherein the plurality of types of network include at least two of:
a multiprotocol label switching network,
a secure network, or
a public network.

19. The non-transitory computer-readable medium of claim 15, wherein the priority of the transaction is defined based on a service level agreement associated with the application.

20. The non-transitory computer-readable medium of claim 15, wherein the transaction is a first transaction, the network traffic is first network traffic, the priority is a first priority, the characteristic is a first characteristic, the network type is a first network type, and the network device is a first network device, and
wherein the one or more instructions, when executed by the one or more processors, further cause the one or more processors to:
detect a second transaction associated with the application,
wherein the second transaction relates to a second interaction between the user and the application;
identify a second characteristic of the second transaction,
wherein the second characteristic of the second transaction is different from the first characteristic of the first transaction;
determine a second priority for second network traffic associated with the application;
select a second network type for the second network traffic,
wherein the second network type is selected, based on the second priority for the second network traffic, from the plurality of types of networks, and
wherein the second network type is different from the first network type; and
cause the second network traffic to be routed, from the user device, through a second network device associated with the second network type.

\* \* \* \* \*